United States Patent
Vilato et al.

[11] Patent Number: 6,120,282
[45] Date of Patent: Sep. 19, 2000

[54] GLASS-CERAMIC PLATE AND ITS MANUFACTURING PROCESS

[75] Inventors: Pablo Vilato, Paris; Michel Grassi, La Ferte-sous-Jouarre, both of France

[73] Assignee: Eurokera, Chateau-Thierry, France

[21] Appl. No.: 09/081,227

[22] Filed: May 20, 1998

[30] Foreign Application Priority Data

May 20, 1997 [FR] France ..................... 97 06114

[51] Int. Cl.[7] ............... F23D 11/36; F24C 15/10
[52] U.S. Cl. .............. 431/154; 126/39 H; 126/214 A; 126/214 R; 219/464; 65/106; 65/107
[58] Field of Search .............. 126/214 R, 214 A, 126/214 C, 39 J, 39 H; 431/154, 295; 219/464; 65/106, 107

[56] References Cited

U.S. PATENT DOCUMENTS

| | | | |
|---|---|---|---|
| 3,114,620 | 12/1963 | Giffen | 65/145 |
| 3,193,367 | 7/1965 | Giffen | 65/70 |
| 3,231,356 | 1/1966 | Giffen | 65/184 |
| 3,582,454 | 6/1971 | Giffen | 65/105 |
| 3,686,477 | 8/1972 | Dills et al. | 219/464 |
| 3,715,550 | 2/1973 | Harnden, Jr. et al. | 126/39 J |
| 3,816,704 | 6/1974 | Borom et al. | 219/464 |
| 3,830,216 | 8/1974 | Dodd | 126/214 A |
| 4,034,253 | 7/1977 | Yamauchi . | |
| 4,361,429 | 11/1982 | Anderson et al. | 65/67 |
| 5,313,929 | 5/1994 | Thurk et al. | 126/214 A |
| 5,402,767 | 4/1995 | Kahlke | 126/39 J |
| 5,549,100 | 8/1996 | Heisner et al. | 126/214 R |
| 5,813,395 | 9/1998 | Taplan et al. | 126/214 A |
| 5,931,152 | 8/1999 | Fafet et al. | 126/39 R |

FOREIGN PATENT DOCUMENTS

| | | |
|---|---|---|
| 0 173 418 | 3/1986 | European Pat. Off. . |
| 0 715 125 A1 | 6/1996 | European Pat. Off. . |
| 2735562 | 12/1996 | France . |
| 132 972 | 7/1902 | Germany . |

*Primary Examiner*—Ira S. Lazarus
*Assistant Examiner*—David Lee
*Attorney, Agent, or Firm*—Oblon, Spivak, McClelland, Maier & Neustadt, P.C.

[57] ABSTRACT

A glass-ceramic plate has at least one opening which is intended to house an atmospheric gas burner. At least part of the edge of the opening is polished and the opening is at the top of a local deformation of the plate.

18 Claims, 2 Drawing Sheets

GLASS-CERAMIC PLATE AND ITS MANUFACTURING PROCESS

BACKGROUND OF THE INVENTION

1. Field of the Invention

The present invention relates to a glass-ceramic plate in which at least one opening is made which is especially intended to house an atmospheric gas burner.

2. Description of the Related Art

Gas cookers or hobs which include gas burners fixed in a metal stand such as a frame or housing are known. In this type of cooking device, a glass plate, generally toughened and made of ceramic or glass-ceramic, covers the peripheral surface of each of the burners. In order not to have to apply force to the plate when mounting it to a burner, which would run the risk of breaking the plate, each opening made in the plate for this purpose is significantly wider than the diameter of the corresponding burner. The large circular gap thus created between the plate and the gas burner is covered with a circular metal collar. The latter ensures that there is mechanical separation which prevents direct contact between the plate and the metal burner, such direct contact being likely to generate cracks in the plate which impair its mechanical strength.

Although fitting a burner into the plate in this way makes it possible to decrease the risk of forming cracks in the plate, this risk nonetheless remains, because of the contact between the collar and the plate. Moreover, this type of fitting has a not insignificant drawback since sealing is not well provided for, and liquids which can spill out from cooking pans may flow between the plate and the metal collar.

Apart from the fact that cleaning this type of fitting is difficult and also often requires at least part of the device to be dismantled, the ingress of liquid under the plate can be dangerous, especially when there are one or more electrical appliances, for example in the configuration in which the cooker is of the combination type which includes heating elements such as radiant or halogen elements.

Improvements have already been proposed. Thus, it is known from EP 715,125 to mount the gas burner into the corresponding opening in the glass-ceramic plate by interposing between them a metal collar in the form of an eyelet which overlaps the edge of the opening and which thus provides mechanical protection. Further, sealing is provided by means of a ring-polished graphite piece positioned at the interface between the plate and the metal collar.

Although such a system is satisfactory with regard to mechanical strength and sealing, it is complicated to fit and cannot be dismantled by the user. Furthermore, the plate cannot be fully cleaned as the edge of the opening is covered. Finally, the cost of the metal cover is relatively high, especially as it consists of a number of components manufactured by drawing and because it makes use of a number of complementary seals or inserts, resulting in a not insignificant increase in the cost of the entire cooker.

SUMMARY OF THE INVENTION

It is an object of the invention to remedy the aforementioned drawbacks and to provide, for a cooker and/or for a temperature maintaining device of the type described above, a glass-ceramic plate having at least one opening especially intended to house at atmospheric gas burner, the mechanical protection of the opening being completely guaranteed while, at the same time, providing perfect sealing with respect to liquids around the opening, without detriment to the ease of cleaning the device.

This and other objects are achieved by polishing at least part of the edge of the opening and providing the opening at the top of a local deformation of the plate.

In the context of the invention, the expression "the opening is at the top of a local deformation of the plate" means that the plane defined by the opening is at a higher level compared with the main plane of the plate and is advantageously parallel to it.

The plate according to the invention satisfactorily solves the aforementioned problem in a simple and inexpensive manner. This is because polishing at least part of the edge of the opening eliminates any risk of mechanical embrittlement. Additionally, once the plate is fitted, the slope around the opening prevents infiltration of the liquids under the plate since these flow down the slope. It is also possible to clean the glass ceramic plate right up to the edge of each opening, and a user can fit/dismantle the gas burner without a specific tool.

According to one particularly advantageous embodiment of the invention, the local deformation has, at least partially, the shape of a truncated cone.

Advantageously, the local deformation is such that the height of the opening above the main plane of the plate is at least 2 mm, and preferably equal to 4 mm.

According to one characteristic of the invention, the edge of the opening is rounded, thereby further increasing its mechanical strength.

The opening in the plate according to the invention may have a diameter of between 4 cm and 10 cm so as to be suitable for all types of existing atmospheric gas burners.

In the configuration in which the abovementioned plate has a smooth face and a face with a boss, the downward slope provided by the local deformation is advantageously directed from the smooth face towards the face with a boss.

Particularly advantageously, the plate is provided with a fibrous annular seal inserted between the atmospheric gas burner and the said plate. In the context of the invention, "provided with" should be understood to mean the fact that the fibrous annular seal may be either rendered integral with the plate, for example by means of an adhesive, or held pressed against the plate by means of the burner, the shoulder of which butts against the plate.

The main function of such a seal is to be an additional element for sealing against liquids. It also provides the mechanical interface between the atmospheric gas burner and the glass-ceramic plate, thus avoiding direct contact between them. This mechanical interface is advantageous because it avoids any risk of causing scratches when fitting the burner into the opening, and it acts as a damper in the event of mechanical shocks.

The glass-ceramic plate according to the invention can be used in a combination-type cooker, i.e., a cooker having at least two different sources of heat by direct or indirect transfer from the latter, for example at least one atmospheric gas burner and at least one heating element such as a radiant element or a halogen element. In this embodiment, the plate has at least one area intended to cover a heating element such as a radiant or halogen element.

The invention relates not only to a glass-ceramic plate in which at least one opening is made, which is especially intended to house an atmospheric gas burner, but also relates to a process for manufacturing such a plate, in which a glass plate on a forming support undergoes a ceramification cycle.

According to the invention, the edge of the said opening is raised with respect to one of the faces of the plate during the glass-plate ceramification cycle. On an industrial scale, the process according to the invention is particularly advantageous for obtaining a glass-ceramic plate according to the invention. This is because the inventive process does not require especially difficult implementation as it is carried out directly during a ceramification cycle, known per se, without any special tool being necessary. In other words, it is inexpensive and therefore the increase in cost of the entire cooker for which the plate is intended is negligible.

Particularly preferably, the plate is raised by means of an approximately cylindrical element positioned on the forming support, the diameter of the said element being greater than the diameter of the opening. This cylindrical element may be hollow or solid, such as a disc. It is made from a ceramic material or a refractory steel. During the ceramification cycle, the plate slumps under its own weight, except at the point where it is held by the cylindrical element, without it being necessary to use a specific tool. This way of carrying out the invention would normally be avoided by those skilled in the art, because they would have been fearful that by allowing the plate to slump in this way, the major part of the plate and its properties, especially its flatness, would not be maintained.

Preferably, the height of the cylindrical element is equal to at least 2 mm, and preferably 4 mm. Also preferably, the difference between the diameter of the disc and the diameter of the opening is at least 5 mm, preferably greater than 10 mm and advantageously about 20 mm. This is because too small a difference would tend to create an intersection of sharp edges in the region of the local deformation of the plate which would be likely to generate cracks deleterious to the mechanical strength of the plate, possibly leading to the latter breaking.

Before carrying out this ceramification cycle, at least part of the edge of the opening is advantageously polished.

BRIEF DESCRIPTION OF THE DRAWINGS

Other details and advantageous characteristics will emerge below from a non-limiting example of a glass-ceramic plate according to the invention, described with reference to the Figures, in which:

FIG. 1b is a detail of FIG. 1a; and

DETAILED DESCRIPTION OF THE PREFERRED EMBODIMENT

For the sake of clarity, the figures are not to scale and the relative proportions between the various elements are not respected.

Figure 1A:
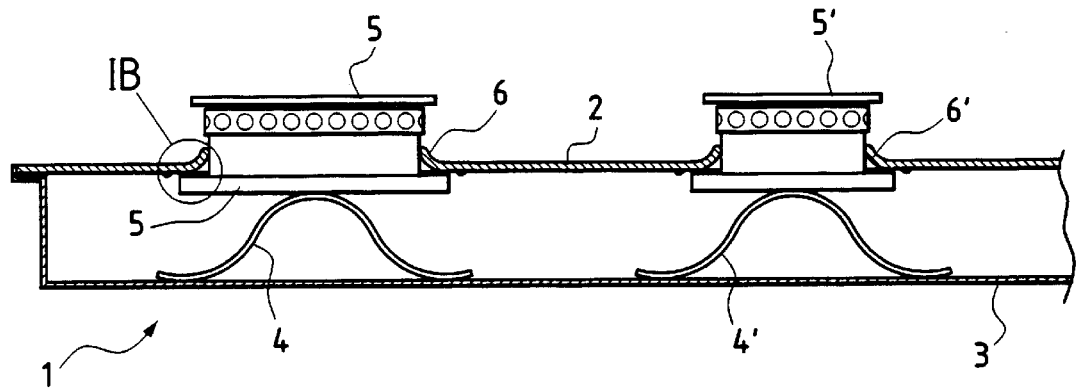
FIG. 1a is a partial cross-section of a cooker comprising a glass-ceramic plate according to the invention.

FIG. 1a is a cross-section of a cooker 1 comprising a glass-ceramic plate 2 according to the invention. The cooker 1 includes a metal stand 3 on the bottom of which two metal springs 4, 4' are fixed, an atmospheric gas burner 5, 5' being supported by each spring and the two gas burners 5, 5' having diameters which differ from each other. Each of the two atmospheric gas burners 5, 5' is fitted into an opening 6, 6', respectively, made in the plate 2. How the atmospheric gas burners 5, 5' are fitted into the corresponding openings 6, 6' made in the glass ceramic plate 2, as well as the characteristics of the opening, will be explained below with reference to FIG. 1b. The air necessary for operating the gas burners is supplied via any means known to those skilled in the art, especially via one or more holes made in the metal stand 3.

Figure 1B:
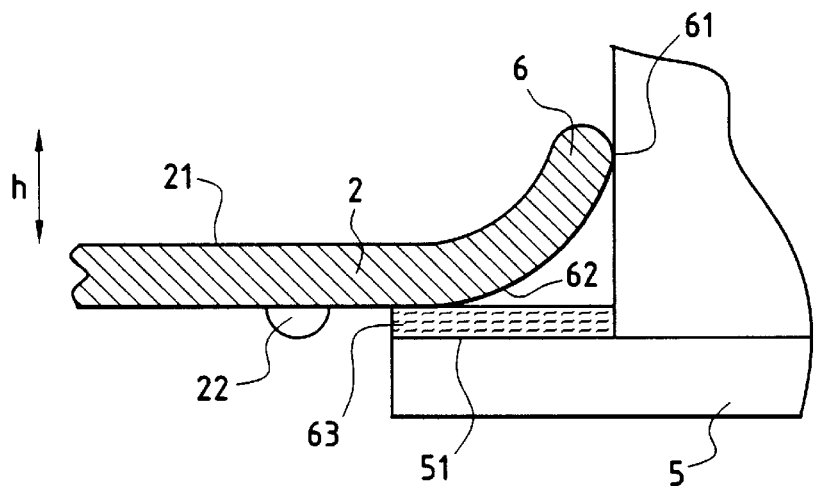

FIG. 1b shows a detail of FIG. 1a. The latter shows the way in which the gas burner 5 is arranged in the glass-ceramic plate 2 according to the invention in the region of its opening 6. This opening 6 has a rounded polished edge 61 which is raised to a height h equal to 4 mm above the smooth surface 21 of the glass-ceramic plate 2 and is thus at the top of a local deformation with a "crater" shape, i.e., a shape in the form of a truncated cone whose base 62 has a concave curvature.

As regards the gas burner 5, this has a shoulder 51 in abutment with the base 62. Inserted between this shoulder and the base 62 is a fibrous seal 63 of annular shape. Judiciously, the latter is chosen to be made of a thermally insulating material.

According to this embodiment, the glass-ceramic plate 2 has a lower face, i.e., that facing the interior of the metal stand 3, which includes bosses 22. These bosses 22 considerably increase the mechanical strength of the lower face of the plate 2 and also avoid dazzling a person looking at the plate 2 from above, by diffracting the light emitted by the heating elements other than gas burners, such as radiant elements, for example, placed under the plate.

The opening 6 in the glass-ceramic plate 2 thus described with reference to FIGS. 1a and 1b is reliably protected from mechanical shocks and is sealed with respect to liquids. Furthermore, the cooker 1 fully meets the safety standards relating to domestic electric cookers, such as the NF EN 60335-2-6 standard.

Figure 2:
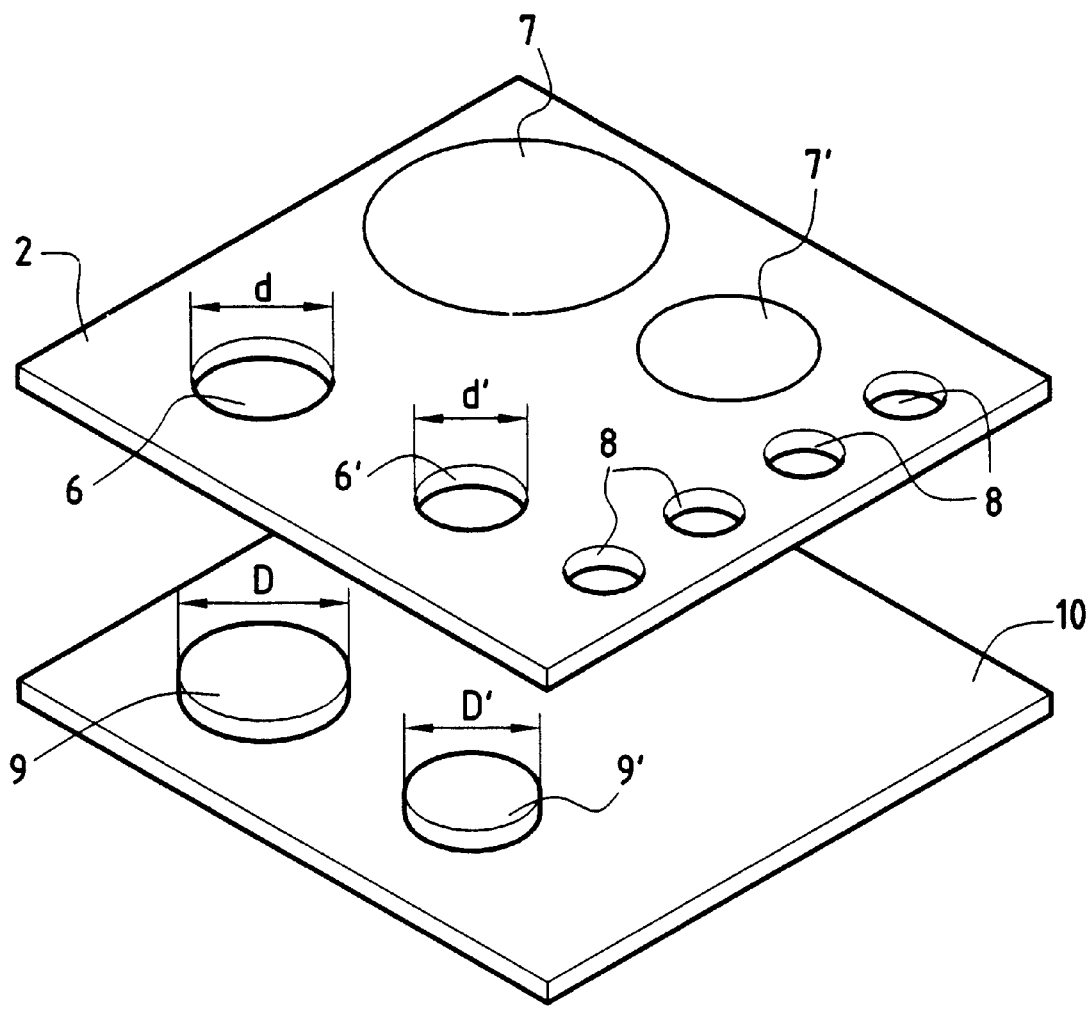
FIG. 2, a perspective illustrating one step in the manufacture of a glass-ceramic plate according to the invention.

FIG. 2 illustrates a step in the process for manufacturing a glass-ceramic plate as described above. FIG. 2 is an exploded perspective view of a perfectly flat glass plate 2 and of a forming support 10 having approximately the same dimensions.

The glass plate 2 includes two circular zones 7, 7', called heater zones, each intended to cover a heating element such as a radiant or halogen element. Provided in this glass plate 2 are four aligned openings 8 of the same diameter, which have been cut out crudely, i.e., without any specific treatment after the cutting operation. These openings 8 are each intended to house the spindle of the control knob which allows the corresponding heating element to be controlled once the plate has been fitted into the cooker 1. Also provided are two other openings 6, 6' of larger diameter d, d', the edges of which have been polished, for example using a grinding tool, in order to give them suitable mechanical strength. These openings 6, 6' are each intended to house an atmospheric gas burner.

Resting on the forming support 10 are two cylindrical discs 9, 9' of the same height, equal to 4 mm, and having diameters D, D' such that the difference between D and d, on the one hand, and D' and d', on the other hand, is about 20 mm, i.e., the discs are 20 mm larger than their respective openings. It is preferable for these discs 9, 9' to have undergone a specific surface treatment so that they do not adhere to the plate 2 during the ceramification cycle. The choice of material for forming these discs is well known to those skilled in the art and may, for example, consist of a ceramic material or a refractory steel.

The process for producing the glass-ceramic plates described with reference to FIGS. 1a and 1b is as follows. The glass plate 2 is placed on the forming support 10 in such a way that the two openings 6, 6', of diameter d, d' respectively, sit exactly over the discs 9, 9', of diameter D, D' respectively, being almost perfectly centered in such a way that they are concentric. Once this centering operation has been carried out, the glass plate 2 undergoes a ceramification cycle in a known manner in order to convert it into a glass-ceramic plate. During this ceramification cycle, the glass plate softens and slumps under its own weight at the point where it is held by the cylindrical discs, i.e., at the openings 6, 6' of diameter d, d', these deforming because of the necking of the material. Apart from the compaction, the thickness of the plate remains constant around each of these openings. A glass-ceramic plate 2 is thus obtained in which two openings 6, 6' are made, each of them being at the top of a local deformation with the shape of a "crater."

Thus, one or more openings are made, these openings being mechanically protected and being sealed with respect to liquids capable of infiltrating through them. The result is all the more satisfactory as it is not accomplished to the detriment of ease of cleaning the cookers for which it is intended.

Although the invention has been described for a specific application, it is not thereby limited to such an application. For example, the invention may be employed so that an opening in the glass-ceramic plate intended to house the spindle of a control knob of a heating element has the local deformation according to the invention.

What is claimed is:

1. A glass-ceramic plate having at least one opening sized and configured to house an atmospheric gas burner, wherein at least part of an edge of said opening is polished, wherein said plate has a local deformation, and wherein said opening is at a top of the local deformation of said plate, wherein a face of the glass plate facing opposite the direction of extension of the local deformation has a boss.

2. The glass-ceramic plate according to claim 1, wherein said local deformation has at least partially the shape of a truncated cone.

3. The glass-ceramic plate according to claim 1 wherein said plate is a planar plate and said local deformation is configured such that a height of the opening above the plane of said plate is at least 2 m.

4. The glass-ceramic plate according to claim 1 wherein said plate is a planar plate and said local deformation is configured such that a height of the opening above the plane of said plate is at least 4 mm.

5. The glass-ceramic plate according to claim 1, wherein the edge of said opening is rounded.

6. The glass-ceramic plate according to claim 1, wherein the diameter of said opening is between 4 cm and 10 cm.

7. A cooker comprising:

a glass-ceramic plate having at least one opening sized and configured to house an atmospheric gas burner, wherein at least part of an edge of said opening is polished, wherein said plate has a local deformation, and wherein said opening is at a top of the local deformation of said plate;

an atmospheric gas burner housed in each said opening; and a fibrous annular seal inserted between each said atmospheric gas burner and plate, wherein a face of the glass plate facing opposite the direction of extension of the local deformation has a boss.

8. The cooker according to claim 7, further comprising at least one electrical heating element.

9. The cooker according to claim 8, including at least one zone of said glass-ceramic plate configured to cover the electrical heating element.

10. A process for manufacturing a glass-ceramic plate having at least one opening sized and configured to house an atmospheric gas burner, comprising the steps of:

positioning a glass plate having an opening on a forming support; and performing a ceramification cycle on the a glass plate, wherein said opening is positioned relative to said forming support such that a region of the glass plate around the opening is raised with respect to the plane of said plate by sagging of the glass plate during the glass-plate ceramification cycle.

11. The process according to claim 10, wherein the forming support includes an approximately cylindrical element located at the opening, the cylindrical element having a diameter greater than a diameter of the opening, so that the region of the glass plate around the opening is raised with respect to the plane of said plate during the glass-plate ceramification cycle due to sagging of the glass plate with respect to that part of the glass plate supported by the cylindrical element during the ceramification cycle.

12. The process according to claim 11, wherein a height of the cylindrical element is equal to at least 2 mm.

13. The process according to claim 11, wherein a height of the cylindrical element is equal to at least 4 mm.

14. The process according to claim 11, wherein a difference between the diameter of the cylindrical element and the diameter of the opening is at least 5 mm.

15. The process according to claim 11, wherein a difference between the diameter of the cylindrical element and the diameter of the opening is greater than 10 mm.

16. The process according to claim 11, wherein a difference between the diameter of the cylindrical element and the diameter of the opening is about 20 mm.

17. The process according to claim 10, including the step of polishing the edge of the opening before carrying out the ceramification cycle.

18. A glass-ceramic plate having at least one opening sized and configured to house an atmospheric gas burner, wherein at least part of an edge of said opening is polished, wherein said plate has a local deformation in the form of an upwardly extending arc having a rounded edge, and wherein said opening is at a top of the local deformation of said plate.

* * * * *